June 18, 1929. G. O. JOHNSON 1,717,384
COASTER WAGON BRAKE
Filed July 25, 1928 2 Sheets-Sheet 2
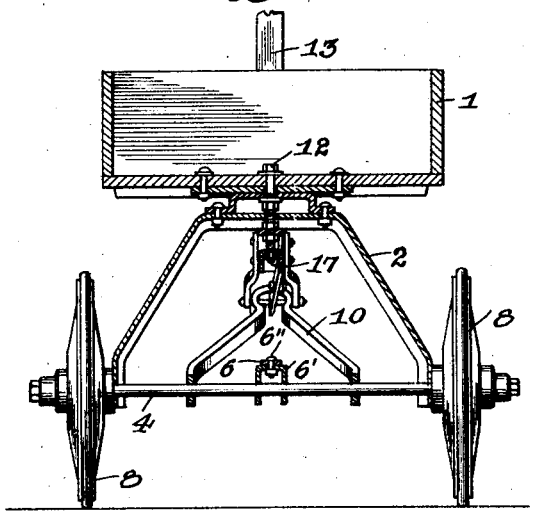
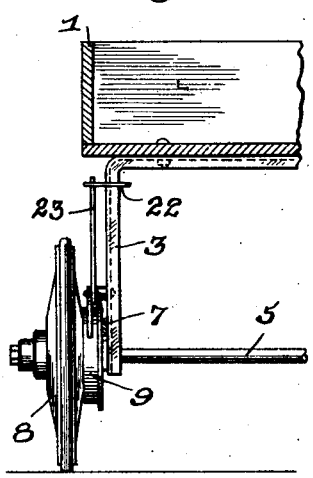
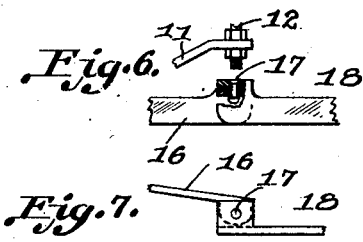
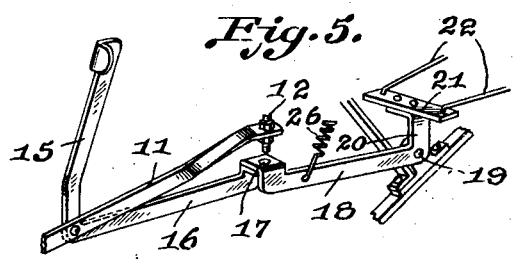
Inventor
G. O. Johnson
By Eccleston & Eccleston
Attorneys Patented June 18, 1929.

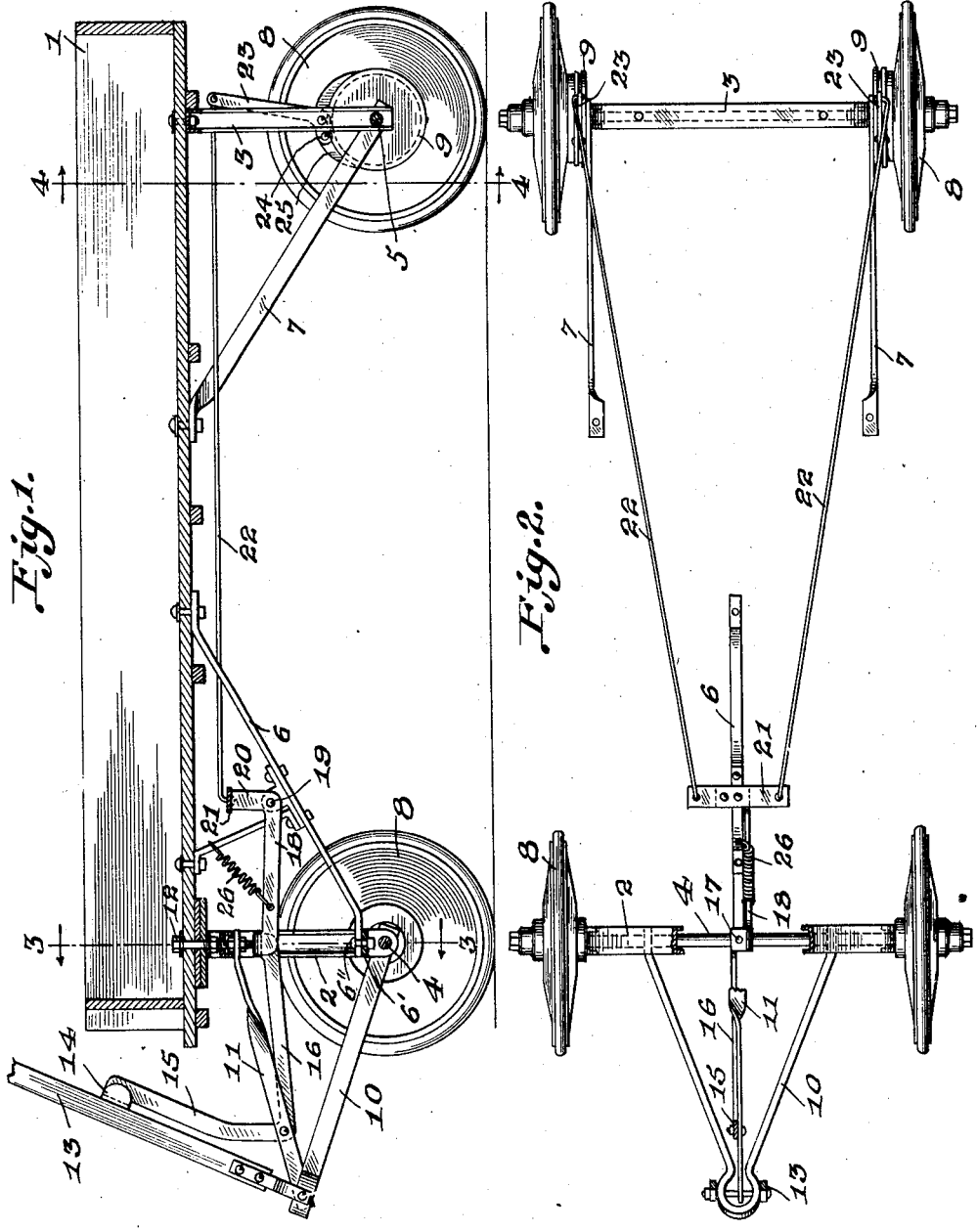

1,717,384

UNITED STATES PATENT OFFICE.

GUSTAF O. JOHNSON, OF ELKHART, INDIANA, ASSIGNOR TO SIDWAY-TOPLIFF COMPANY, OF WASHINGTON, PENNSYLVANIA.

COASTER-WAGON BRAKE.

Application filed July 25, 1928. Serial No. 295,131.

This invention relates to toy vehicles and especially those of the coaster wagon type, and has for its object to provide a novel construction of brake operating means for such vehicles which is strong and durable in construction and reliable in operation.

A further object of the invention resides in the provision of such a mechanism which is operable by a slight movement of the wagon tongue when in steering position, and which is so designed as to function while the vehicle is traveling on a curve as well as in a straight path.

Other objects and advantages of the invention will be apparent from the following description taken in connection with the accompany drawings; in which Figure 1 is a vertical longitudinal sectional view through the improved vehicle.

Figure 2 is a plan view of the device with the vehicle body removed.

Figure 3 is a transverse sectional view taken on line 3—3 of Figure 1, looking in the direction of the arrows.

Figure 4 is a fragmentary detail view taken on line 4—4 of Figure 1.

Figure 5 is a perspective view of the forward part of the brake operating means; and Figures 6 and 7 are detail views of certain of the mountings.

Referring to the drawings in more detail the numeral 1 indicates the coaster wagon body which may be made of any conventional design. The body 1 is secured to the front and rear brackets 2 and 3 which are of an inverted U-shape construction having their lower ends mounted on front and rear axles 4 and 5 respectively. Also secured to the wagon body and adjacent the center thereof are front and rear brace rods 6 and 7 which have their opposite ends attached to the front and rear axles 4 and 5 respectively. The connection between the brace 6 and axle 4 comprises a bracket 6' mounted on the axle and a pivotal connection 6'' between the brace rod and the bracket; thereby allowing for a horizontal turning movement of the front axle.

Mounted on the ends of the axles 4 and 5 are wheels 8 preferably of the disc type, and the rear wheels are provided with brake drums 9 for cooperation with the brake shoes to be hereinafter described.

Mounted on the front axle 4 is a yoke 10 which is fixedly secured in a substantially horizontal plane by means of a brace member 11 which is attached to the front end of the yoke, and which has its opposite end pivoted on bolt 12. The bracket 2 and yoke 10 together constitute the front frame of the vehicle. The bolt 12 passes down through the body of the wagon at the forward end thereof, through bracket 2 and is then passed through an opening in brace member 11.

To the forward end of yoke 10 is pivotally connected the wagon tongue 13 which serves as a convenient means for pulling the wagon and also for steering purposes. When swung to the rearwardly inclined position shown in Figure 1 the tongue 13 may also be manipulated by the occupant of the vehicle for braking purposes. On the inner face of tongue 13 I provide a wear plate or abutment 14 which operates in conjunction with tongue 13 to apply the brake to the vehicle. This latter mechanism will now be described.

Pivoted on the brace rod 11 is a bell-crank lever which has its vertically extending arm 15 disposed adjacent tongue 13 when the latter is in position for operation by the occupant of the vehicle. The other arm 16 of the bell-crank is pivotally connected by pin 17 with arm 18 of another bell-crank lever which is pivotally connected at 19 to the brace rod 6. It is to be particularly noted that pivot 17 permits of a relative movement between the parts in a horizontal plane, and furthermore the pivotal connection is a loose one (Fig. 6) so as to also permit of a relative movement between these parts in a vertical plane. The other arm 20 of the second-mentioned bell-crank lever has a transverse bar 21 fixedly secured to the upper end thereof, and pivoted in the ends of this bar are brake rods 22. These rods extend rearwardly to a point above the rear axle 5 and are pivotally connected to bell-crank levers 23 on opposite sides of the vehicle. The levers 23 are pivotally connected to the outside of the legs of the bracket 3 and their shorter arms 24 carry brake shoes 25 which are pivotally connected thereto so as to more readily adapt themselves to the brake drums 9 of the rear wheels. A coil spring 26 connected to bell-crank arm 18 and the wagon frame serves to return the brake mechanism to normal position after each application.

In the operation of the device the brake is applied by drawing the tongue rearwardly as indicated in Figure 1. This movement of the tongue will swing bell-crank 15—16 downwardly about its pivot, and due to connection 17 will also swing bell-crank 18—20 downwardly about its pivot 19. As arm 20 is drawn forwardly it draws with it the brake rods 22 which, of course, causes the brake shoes 25 to frictionally grip the brake drum 9 to stop the vehicle.

As already briefly mentioned, the arms 16 and 18 of the two bell-cranks are so connected as to allow relative movement in both horizontal and vertical planes. Consequently, the bell-crank 15—16 which is mounted on brace rod 11 moves in a horizontal plane with yoke 10 and tongue 13. By reason of this construction the bell-crank 15—16 is always in the plane of movement of tongue 13 thereby affording a construction which will admit of application of the brakes irrespective of the particular position of the front wheels, i. e., irrespective of whether or not the vehicle is traveling in a straight line.

From the foregoing description and the attached drawings it will be apparent that I have devised an exceedingly inexpensive yet sturdy construction of brake operating means for children's vehicles, which is efficient in operation and which is also capable of operation at all times to apply the brakes irrespective of the particular position of the steering mechanism.

In accordance with the patent statutes I have described what I now believe to be the best embodiment of the invention but I do not wish to be understood thereby as limiting myself or the scope of the invention, as many changes and modifications may be made without departing from the spirit of the invention; all such I aim to include in the scope of the appended claims.

What I claim as new and desire to secure by Letters Patent is:

1. A child's vehicle, including a body, rear wheels mounted thereon, a pivoted front frame, wheels mounted thereon, brake shoes, a steering tongue, and brake shoe operating mechanism, a portion of said mechanism mounted on said front frame and adapted to be operated by said steering tongue.

2. A child's vehicle, including a body, rear wheels mounted thereon, a pivoted front frame, wheels and a steering tongue mounted thereon, brake shoes for the rear wheels, and brake shoe operating mechanism including a bell-crank lever mounted on said front frame in cooperative relation with said tongue.

3. A child's vehicle, including a body, rear wheels mounted thereon, a pivoted front frame, wheels and a steering tongue mounted thereon, brake shoes for the rear wheels, a bell-crank lever on said front frame in cooperative relation with said tongue, and a system of rods and levers associated with said bell-crank lever and said brake shoes.

4. A child's vehicle, including a body, rear wheels mounted thereon, a pivoted front frame, wheels and a steering tongue mounted thereon, a brace rod for the front frame, oppositely disposed bell-crank levers mounted on said front frame and said brace rod, a pivotal connection between the adjacent ends of said bell-crank levers, said connection being in line with the pivot point of said front frame, brake shoes, and an operative connection between said bell-crank levers and brake shoes.

5. A child's vehicle, including a body, rear wheels mounted thereon, a pivoted front frame, wheels and a steering tongue mounted thereon, brake shoes for the rear wheels, a bell-crank lever on said front frame in cooperative relation with said tongue, a system of rods and levers associated with said bell-crank lever and said brake shoes, and a spring for returning said parts to inoperative position.

GUSTAF O. JOHNSON